June 4, 1929.   A. FLAMM   1,716,266
VENDING MACHINE FOR FRANKFURTER SANDWICHES
Filed July 15, 1927   5 Sheets-Sheet 1

Inventor
Alexander Flamm
By Wooster & Davis
Attorneys

June 4, 1929.  A. FLAMM  1,716,266

VENDING MACHINE FOR FRANKFURTER SANDWICHES

Filed July 15, 1927   5 Sheets-Sheet 2

Inventor
Alexander Flamm
By
Wooster & Davis
Attorneys

Inventor
Alexander Flamm
By Wooster & Davis
Attorneys

June 4, 1929.  A. FLAMM  1,716,266

VENDING MACHINE FOR FRANKFURTER SANDWICHES

Filed July 15, 1927   5 Sheets-Sheet 4

Inventor
Alexander Flamm
By Wooster & Davis
Attorneys

June 4, 1929. A. FLAMM 1,716,266
VENDING MACHINE FOR FRANKFURTER SANDWICHES
Filed July 15, 1927 5 Sheets-Sheet 5

Inventor
Alexander Flamm
By Wooster & Davis
Attorneys

Patented June 4, 1929.

1,716,266

UNITED STATES PATENT OFFICE.

ALEXANDER FLAMM, OF BRIDGEPORT, CONNECTICUT.

VENDING MACHINE FOR FRANKFURTER SANDWICHES.

Application filed July 15, 1927. Serial No. 205,977.

This invention relates to a machine for vending frankfurter or sausage sandwiches, and has for an object to provide a coin control mechanism which will automatically take a roll from a source of supply, heat the roll, slit it, take a sausage or frankfurter from a source of supply, heat it and deposit it in the slit roll, apply mustard or other seasoning to the frankfurter, will wrap the completed roll in a sanitary wrapping, deposit it in a receptacle where it is accessible to a customer and will automatically reset the machine for another similar operation.

With the foregoing and other objects in view, I have devised the construction illustrated somewhat diagrammatically in the accompanying drawings forming a part of this specification. In these drawings.

Fig. 7 is a partial plan view and partial horizontal section of this holder.

Fig. 15 is a diagrammatical view of the electrical connections.

Fig. 17 is a view looking from the right of Fig. 16.

The mechanism of the device is enclosed within any suitable casing 20 which is shown merely diagrammatically, but which will preferably have sufficient glass covered openings to permit the operation of the mechanism to be clearly observed. All of the various devices are operated in certain timed relation with each other from a common source of power as an electric motor 21. This motor drives a main shaft 22 through a belt or chain 23 and this shaft drives another shaft 24 at substantially right angles to it through a bevel gear connection 25.

*Roll and frankfurter supplies.*

Mounted at the upper rear part of the machine is a reservoir 26 for holding a supply of frankfurters. These frankfurters, shown at 27, are preferably mounted and individually retained in loops 28 on a belt 29, and the belt filled with these frankfurters will be folded in the container or reservoir 26 and will be fed from this reservoir with a step by step movement as the frankfurters are individually employed to make up sandwiches.

Figure 6:
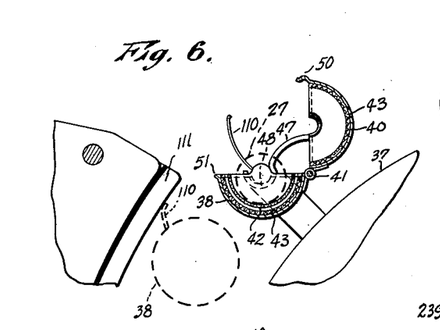
Fig. 6 is a detail section and elevation of a holder on the frankfurter transfer device and also on the roll transfer device, the section being substantially on line 6—6 of Fig. 7.

At the forward part of the machine is a similar reservoir 30 for rolls 31. These rolls are also individually mounted in loops 32 of a belt 33 which is folded in the reservoir and is fed from it with a step by step movement as the rolls are used for forming the sandwiches. The rolls and frankfurters are transferred one at a time from their respective belts to a make-up station indicated generally at (A) in Fig. 1. The compartments for frankfurters and rolls can be loaded with magazine made from metal with filled belt inside ready for use. The transfer device for the roll comprises a wheel 34 carrying an elongated holder 35 secured to the wheel. This holder includes an outer pivoted cover section 36 operated in a manner presently to be described. The transfer device for the frankfurter comprises a wheel 37 carrying a similar holder 38 for the frankfurter. As these two holders are of the same construction and operate in the same manner one only will be described in detail. Referring to Figs. 6 and 7 the frankfurter holder 38, as shown, comprises a lower or body section which is an elongated trough shape and is secured to the wheel 37 to move therewith by suitable mounts 39. This body is rigidly mounted on these supports so that it does not turn relative thereto. The cover section 40 is of similar shape to the body and is hinged thereto at one side, as shown at 41. When the cover and body are together they form a substantially cylindrical holder for the frankfurter. Mounted inside of this holder is a substantially semi-cylindrical basket or cage 42 of some open work construction, as for instance wire, and it is spaced from the walls of the holder. Mounted between this cage and the walls, both in the cover and the body, are electrical heating elements 43, and the cage is rotatably mounted so as to turn within the holder, the pivots being shown at 44. One of these pivots carries a gear 45 which may mesh with a stationary curved rack 46 during a certain portion of the revolution of the wheel to rotate the cage, and therefore, turn the frankfurter or roll relative to the heating elements. The cover carries at one end a spring 47 having a loop 48 at its free end to engage an extension 49 of the mounting for the body. When the cover is swung to open position, as shown in Fig. 6, the loop 48 may engage the extension 49 and yieldingly retain this cover in the open position. The cover may be forced closed as the spring will yield under pressure. The cover is retained closed by a spring catch 50 engaging a lug or lip 51 on the body. The cover is swung to the open and closed positions by means of a gear 52 connected thereto and operated by short racks 53 and 54 located at the receiving end and at the discharge station respectively. If desired there may be more than one of the holders 35 and 38 on the transfer wheels.

*Roll and Frankfurter feeds.*

The feeding means for forcing the rolls and the frankfurters from their respective belts so that they may pass to the transfer devices are the same so I will describe only one of them in detail. This feeding device for the frankfurter is indicated as a whole at (F) and that for the roll at (G). It will be apparent from Fig. 2 that the two belts are placed in substantial alignment and the feeding device (F) for the frankfurter forces the frankfurter in one direction from the belt while the feeding device (G) for the roll forces the rolls in the opposite direction, but they are of the same mechanism and operate in the same manner. These devices are shown more in detail in Figs. 2, 3 and 4. They each comprise a plunger 55 adapted to engage the end of a roll or frankfurter and push it from its loop on its carrying belt. This plunger is reciprocable and has two guide rods 56 on opposite sides thereof guided for reciprocation in guide brackets 57. Springs 58 on these rods tend to hold the plunger in the retracted position shown in Figs. 2 and 3. The plunger also includes a sliding body 59 below it having grooves 60 in its side walls for guide ribs 61 carried by the brackets 57 and on the under side of this body or slide is a rack 62. At the outlet side of the belt is a trip lever 63 pivoted at 64 and connected by a rod 65 with a pivotal support 66 for a pinion 67. This support 66 is pivoted in brackets 68 at 69. The trip lever 63 is arranged in alignment with one of the rods 56 and a spring 70 tends to swing the support 66 to bring the pinion 67 into engagement with the rack 62. The lower end of this support 66 is notched to receive the upper end of a pivoted catch 71, and a spring 72 tends to swing this catch clockwise, as viewed in Fig. 4, to the dotted line position while a solenoid 73 may swing this catch in the opposite direction when energized.

Figure 2:
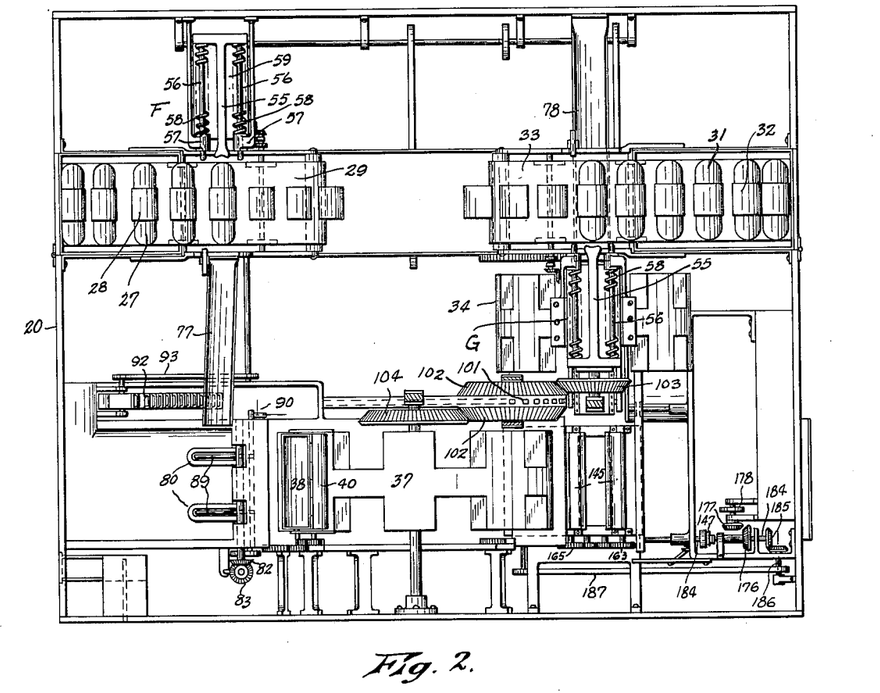
Fig. 2 is a top plan view thereof.
Figures 4, 5:
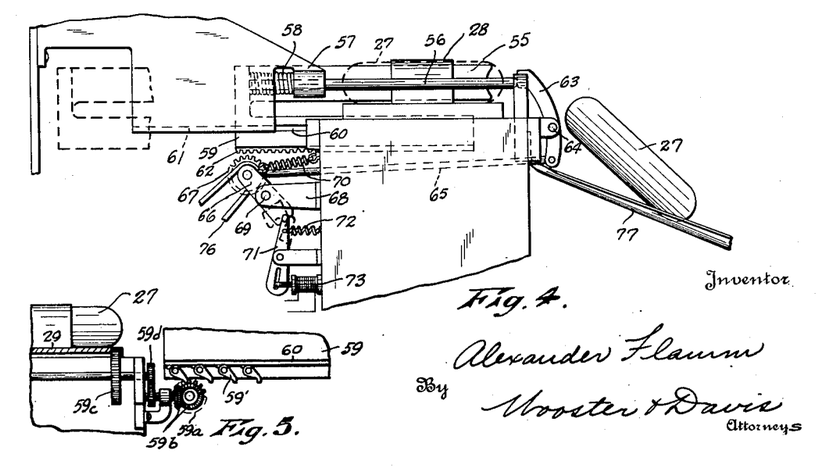
Fig. 4 is a detail view of the roll and sausage feeding device illustrating its method of operation.
Fig. 5 is a detail of a portion of the roll and sausage feeding device.

In operation the circuits are closed and the motor 21 started as will presently be described. The counter shaft 74 will be driven by this motor from the shaft 24 through the belt or chain 75 and a belt or chains 76 drives the pinion 67 from the counter shaft. Normally this pinion is in mesh with the rack 62, and therefore, as soon as it begins to rotate it will advance this rack and the plunger 55 forcing a frankfurter 27 from the loop of its belt into the chute 77, as shown in Figs. 2 and 4. At the end of the movement of the plunger one of the rods 56 will engage the trip lever 63 forcing the pinion 67 out of mesh with the rack, and as the circuit is closed through the solenoid 73 it will move the catch 71 counterclockwise bringing its upper end into the notch in the lower end of the support 66 and will hold the pinion out of mesh with the rack until the circuit is again broken as the machine ceases to function. However, during this time the springs 58 will retract the plunger to its original position and when the circuit is broken and the motor 22 stops the solenoid 73 will release the catch 71 allowing the spring 72 to withdraw it from the end of the support 66, thus releasing this support and permitting the spring 70 to again move the pinion 67 into mesh with the rack 62 so that it is ready for the next operation.

Figure 3:
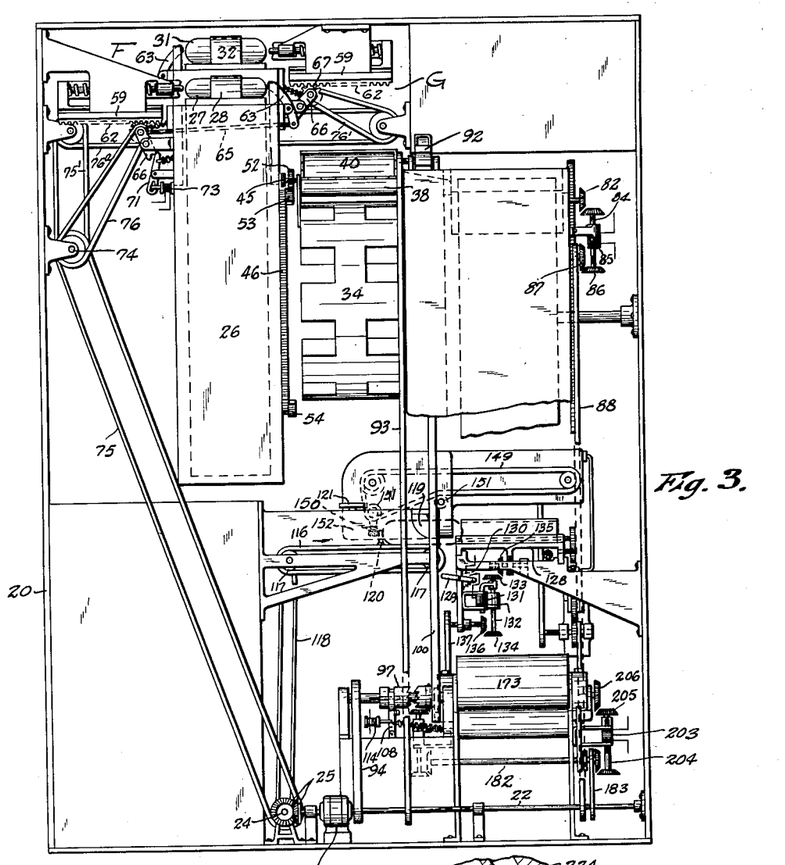
Fig. 3 is a rear elevation looking from the left of Fig. 1.

As indicated above the same kind of mechanism is used for discharging the rolls 31 from the loops 32 of the roll belt 33, these rolls being discharged into the chute 78 by which they are conducted to the holder 35 on the transfer device 34. As shown in Fig. 3 this discharge mechanism for the rolls is driven by a chain 75' running from shaft 74 to a short shaft having a sprocket to drive chain 76ª which in turn drives chain 76' driving gear 67. As the plunger is retracted its movement is employed to advance the carrier belt 33 to bring the next frankfurter into the position in front of the plunger. For this purpose there is mounted on the slide 59 a plurality of pivoted pawls 59' (Fig. 5) adapted to engage a ratchet 59ª and through the bevel gears 59ᵇ operate the sprocket 59ᶜ by means of the gears 59ᵈ. This sprocket advances the belt 33 to bring the next frankfurter into proper position. The pawls 59' engage the ratchet wheel only toward the end of the backward movement of the plunger so that the plunger is withdrawn from the loop on the belt and is moved out of the way of the next succeeding frankfurter before the belt shifts.

Figure 1:
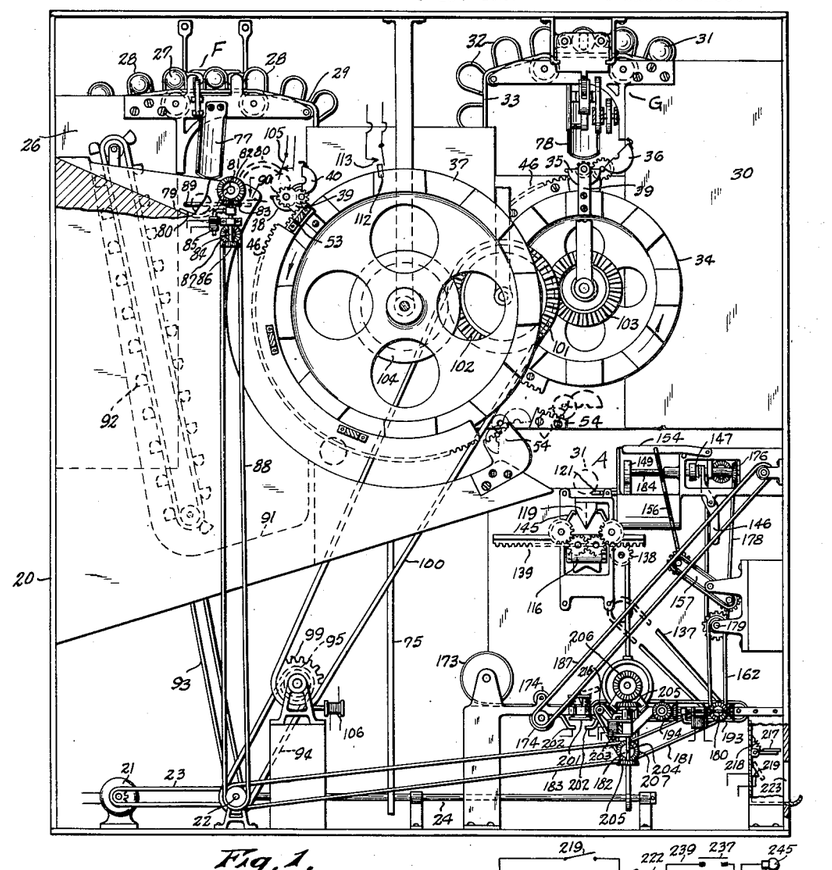
Fig. 1 is a side elevation of the device showing the relative positions of the various elements.

The chute 77 leading from the frankfurter discharge mechanism leads to a reservoir or receptacle 79 for oil so that this receptacle is located between the frankfurter supply mechanism and the transfer mechanism 37—38. Located in this receptacle are hinged fingers 80 which are curved, as indicated in Fig. 1, and onto which the frankfurter is deposited from the chute. The frankfurter will be covered with oil in the receptacle. The fingers 80 are carried by a shaft 81 driven by a beveled gear 82 meshing with a gear 83 on a short shaft 84. This shaft is mounted to slide longitudinally under the action of a solenoid 85 and is driven by means of bevel gears 86—87 through a chain or belt 88 from the shaft 22. When this solenoid is energized it will slide the short shaft 84 upwardly bringing the gears 83—86 in mesh with the gears 82 and 87 respectively, which will rotate the shaft 81 clockwise or to the right, as viewed in Fig. 1, to the dotted line position, carrying with them the frankfurter, as indicated in dotted lines, and depositing it in the holder 38 of the transfer mechanism. The solenoid 85 is controlled by a finger 89 operating a switch contact 90. As the frankfurter falls into the receptacle it will push this finger downwardly closing the circuit through the solenoid so that it will operate the fingers as described. When the circuit is broken the shaft 84 with its gears will fall by their own weight out of mesh with the driving and driven gears. As previously described the frankfurters are heated and roasted in the holder 38 and oil or grease dripping therefrom will fall into the receptacle 91 and will be carried from it by means of the conveyor 92 to the receptacle 79. This conveyor is driven from the shaft 22 by a chain or belt 93.

*Drive for roll and frankfurter transfer devices.*

Figures 19, 20:
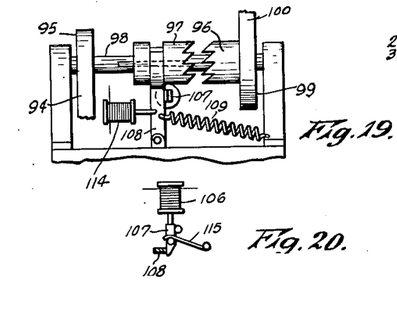
Figs. 19 and 20 are detail views of the control for the drive for the transfer mechanism.

The transfer devices 34 and 37 are driven from the shaft 22 through the drives shown in Figs. 19 and 20. The belt or chain 94 leads from shaft 22 to a pulley or sprocket 95 driving a shaft 98 on which is splined a sliding collar 97 having clutch teeth on one end thereof adapted to mesh with similar teeth 96 on a sprocket 99 free on the shaft. This collar 97 although it is slidable on the shaft, will rotate with the shaft. The sprocket 99 is connected by a chain 100 to a sprocket 101. This sprocket drives bevel gears 102 meshing with gears 103 and 104 connected to the shafts carrying the transfer wheels 34 and 37 respectively. The clutch mechanism 96 is controlled by one of these transfer devices. At the beginning of a vending operation the transfer devices 34 and 37 are in substantially the positions shown in Fig. 1 with the holders 35 and 38 in position to receive the rolls and the frankfurters respectively from the supply devices. As the fingers 80 are swung to deposit the frankfurter in the holder 38 they close the switch 105 which is in the circuit of the solenoid 106. This solenoid retracts the catch 107 which normally holds the clutch lever 108 in the position of Figs. 19 and 20 with the teeth of the collar 97 disconnected from the teeth 96. As this catch 107 is released spring 109 throws the clutch in and completes a driving connection from the shaft 22 to the sprocket 101. The transfer devices 34 and 37 then begin to rotate, the first action being to cause the gears 52 connected to the covers of the holders to engage the short racks 53 and close the covers. As these transfer devices continue to rotate the gears 45 mesh with the racks 46 and rotate the cages in the holders. The holders also carry brush contacts 110 (Fig. 6) to engage insulated stationary contacts 111 closing the circuits through the heating elements 43 in the holders. When these holders 35 and 38 reach the dotted line positions at the lower sides of the wheels 34—37 the gears 52 on the covers engage the short racks 54 and swing the covers to the open position permitting the roll and the frankfurter to be dropped from the cages in the holders as these cages are turned over. The transfer devices 34 and 37 and the driving connections are so proportioned that the roll reaches its lower position and is discharged from its holder sometime in advance of the frankfurter to allow sufficient time for the roll to be slit lengthwise and placed in position to receive the frankfurter. These operations are performed at station (A). After the roll and the frankfurter have been discharged from the transfer devices these devices continue to rotate to bring the holders 35 and 38 back to their original full line positions as shown in Fig. 1, in position to receive the roll and frankfurter for the next vending operation. When they reach these positions their movement is arrested by lug 112 on the transfer device 37 closing the switch 113 which energizes the solenoid 114 (Fig. 19) which releases the clutch 97 and the spring 115 will shift the catch 107 back of the lever 108 and hold it in the retracted position until released for the next operation.

Roll slitting device.

Figure 11:
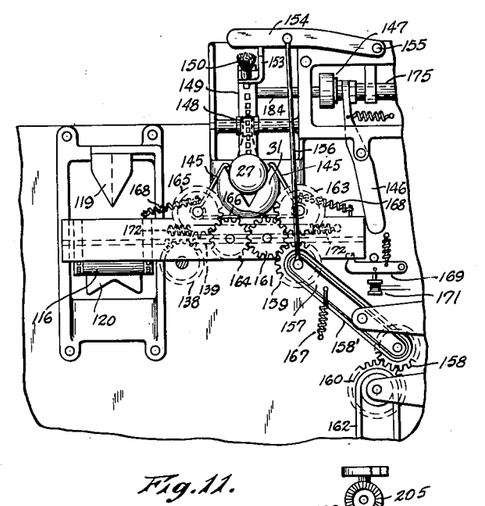
Fig. 11 is a side elevation of the roll slitting device and associated mustard applying device.
Figures 12, 18:
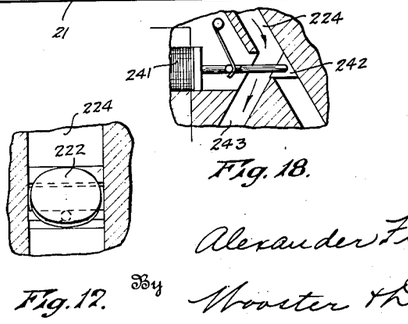
Fig. 12 is a side elevation of the operating mechanism for the roll slitting device.
Fig. 18 is a detail section of a portion of the device for rendering the machine ineffective when either the supply of the rolls or frankfurter sausage is exhausted.
Figure 12:
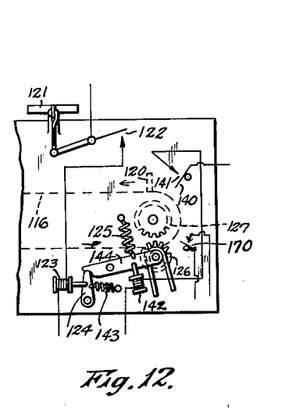

As the roll is discharged from its holder 35 it drops onto a conveyor 116. The conveyor in the form shown comprises an endless belt running over sprockets 117 at the opposite ends thereof, and the left hand sprocket (Fig. 3) is driven from the shaft 24 by the chain 118. Mounted over the conveyor 116 is a knife 119 and it is located adjacent the outlet end of the conveyor. This conveyor carries a stop 120 which engages one end of the roll, as indicated in Fig. 3, and pushes the roll past the knife to slit the roll longitudinally on its top side. This knife has its opposite edges arranged at a considerable angle, as indicated in Figs. 1 and 11, so that as the roll passes by the knife it is spread as well as slit. As the roll drops onto this conveyor it trips the catch 121 (Fig. 12), closes the switch 122 and energizes the solenoid 123. This trips the catch 124 allowing the spring 125 to swing the gear 126 into mesh with the gear 127. The gear 126 is driven by the belt 118, and therefore, it will drive the conveyor 116 and will advance the roll past the knife 119 slitting it from end to end. At the same time it pushes the roll onto a carriage 128. As the conveyor 116 continues to advance stop 120 engages a lever 129 (Fig. 3) which closes the switch 130 and energizes the solenoid 131. This solenoid shifts the shaft 132 carrying the bevel gears 133—134 into mesh with gears 135 and 136 respectively. Gear 136 is driven from the shaft 22 by the chain 137 through chains 183 and 181, shafts 182 and 180, and therefore, will drive the pinion 138 meshing with the rack 139 in the bottom of the carriage and will shift this carriage to the right, as shown in Fig. 11. Continued movement of the carrier 116 will bring the stop 120 into engagement with the lever 140 closing a switch 141 which will energize the solenoid 142 and withdraw the gear 126 from mesh with the gear 127. As the circuit through the solenoid 123 is broken spring 143 will swing the catch 124 into the notch in the end of the carrier arm 144 and prevent further movement of the carrier 116 until the catch 121 is again tripped by the next roll.

Mustard applying device.

The carriage 128 is provided with a pair of gripping and holding arms or plates 145 between which the roll is inserted and as the roll is moved onto the carriage it is in position to receive the frankfurter from the holder 38 on the transfer device 137. This frankfurter drops from this holder into the opened roll and the movements of the devices are so timed that the frankfurter drops into the slit roll between the time the roll is put onto the carriage 128 and the time the stop 120 engages the lever 129. Therefore, when the stop engages the lever 129 the frankfurter is already in the roll and the filled roll is carried with the carriage 128 when it is shifted to the right, as viewed in Fig. 11, by means of the pinion and rack 138 and 139. This lateral movement of the carriage shifts the filled roll to the position of Fig. 11 and in position for applying mustard or similar seasoning to the frankfurter. As the carriage moves to this position it engages the lever 146 closing a clutch 147 which drives a sprocket 148 carrying an endless chain 149. This chain carries a brush 150 and runs over guide rollers 151 which causes the brush to dip down into a reservoir 152 for the mustard or other seasoning, and as this brush continues to advance it passes along the upper surface of the frankfurter and brushes the mustard on it. After the brush passes over the frankfurter a stop 153 on the chain engages the lever 154 pivoted at 155 and swings the free end of this lever upwardly and through a link 156 swings the carrier arm 157. This carrier arm carries at its opposite ends gears 158 and 159 whose shafts are connected to rotate together by chain 158', and as the arm is swung these gears are placed in mesh with the gears 160 and 161 respectively. As gear 160 is driven by a chain 162 from the shaft 22 through connections which will later be described the gear 161 is now driven. This gear meshes with gears 163 and 164 and gear 164 meshes with gear 165. The gears 163 and 165 are secured to shafts carrying the roll gripping arms or plates 145 and they also carry lower plates 166 which have up until this time supported the filled roll. The arms 145 are, therefore, swung toward each other and they grip and press the opposite sides of the roll together firmly clamping them against the sides of the frankfurter. The plates 166 also move downwardly permitting the roll to pass down between them onto a wrapping device indicated as a whole at (B). As soon as the stop 153 and the brush chain releases the lever 154 spring 167 moves the gears 158—159 out of mesh with their respective gears and permits the arm 145 and plates 166 to be swung back into their original position by springs 168. The carriage 128 remains in the position of Fig. 11 until after the filled roll has been passed to the wrapping device, as above indicated, and is held in this position by catch 169 at which time the stop 120 engages a switch lever 170 closing the circuit through the solenoid 171 which releases this catch and permits the carriage to be moved back to its original position by a spring 172 into alignment with the knife to receive the next roll. This backward movement of the carriage releases the lever 146 and clutch 147 so stopping movement of the brush until the next operation.

Wrapping device.

Figure 13:
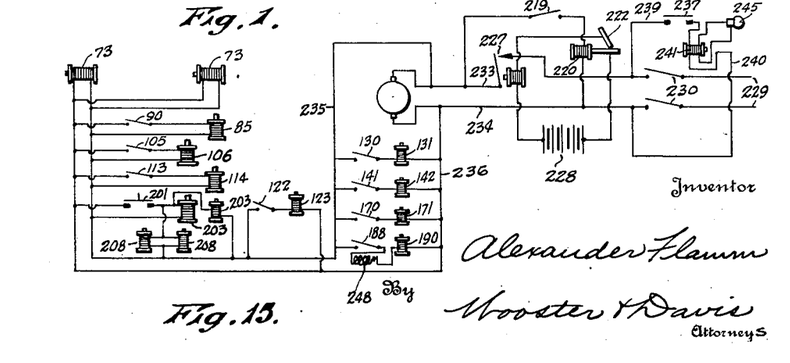
Fig. 13 is a top plan view of the wrapping device.
Figures 13, 14:
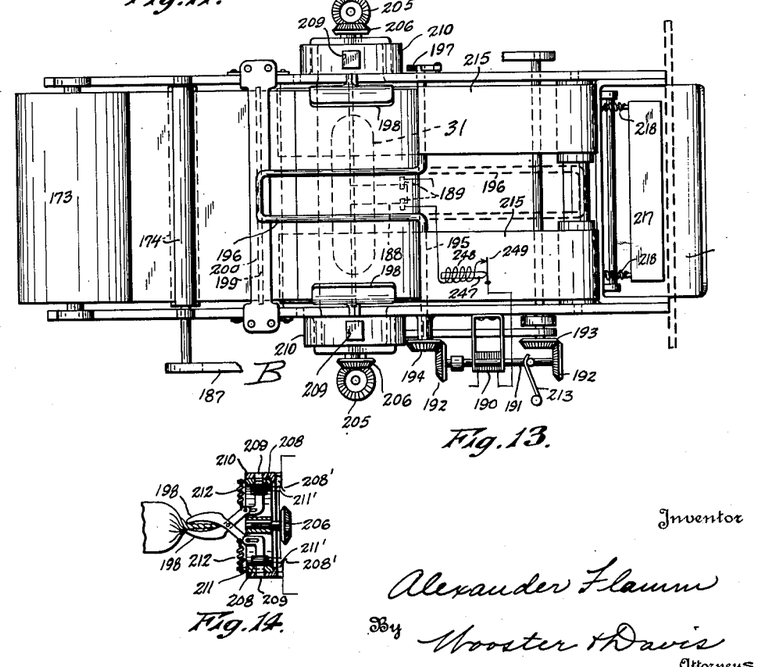
Fig. 14 is a detail thereof.

The wrapping device is shown more particularly in Figs. 1, 3, 13 and 14. It includes a support for a roll of paper 173, the free end of which passes between a pair of feed rolls 174, one of which, in the present instance the lower one, is driven from the operating mechanism for the mustard brush so that the proper length of paper is drawn off from the roll by the time the filled roll drops from the carriage 128. The slidable member of the clutch 147 includes a tubular shaft 175 on which is mounted a bevel gear 176 which when the clutch is thrown in meshes with a gear 177, and therefore, the shaft 184 which drives the brush chain 149 is driven from the gear 177. This gear is driven by a chain 178 from a short shaft 179 on which the gear 160 is mounted. Chain 162 is driven from a short shaft 180 which in turn is driven by a chain 181 from a short shaft 182 and this is driven by a chain 183 from the shaft 22. The brush chain driving shaft 184 also drives bevel gears 185 which through the short shaft 186 drives the chain 187 which drives the lower paper feed roll 174 and draws off the proper length of paper while the brush chain is operating. Therefore, when the filled roll is dropped from the carriage onto the wrapping device the proper length of paper has already been drawn off and placed in position to receive it. As the roll drops onto this device it presses down the switch lever 188 closing circuit from contacts 189 to a solenoid 190. This solenoid shifts the shaft 191 so that the two gears 192 carried thereby mesh with gears 193 and 194. Gear 193 is on shaft 180 and thus the gear 194 will be driven. This gear is on a shaft 195 including a swinging arm 196 which is thus swung counterclockwise against the action of a spring 197. It is preferred that one set of these gears be friction gears to permit slippage if the switch should be closed longer than necessary to operate. This will wrap the forward end of the paper up over the roll which is in alignment with the paper twisting clamps 198, and as the arm is swung over it engages the top of the knife 199 forcing it downwardly and cutting off the paper, this knife having shearing action with a stationary blade 200 under the paper. As this knife moves downwardly it carries a contact 201 into engagement with contacts 202, thus causing the circuit through a pair of solenoids 203, one on each side of the device for operating each pair of twisting clamps 198 which shifts a short shaft 204 carrying gears 205 into mesh with gears 206—207. As the two gears 207 are driven by the shaft 182 the two pairs of clamps 198 will be rotated. It is preferred that one set of these gears, as the upper set 205—206, be friction gears to allow a certain amount of slippage when necessary. These clamps, however, cannot rotate until released by the solenoids 208. The switch 201—202 energizes these solenoids the same time it energizes the solenoids 203 and these solenoids 208 by moving their cores toward each other, as shown in Fig. 14, clamps the clamps 198 on the opposite ends of the paper around the roll. While not operating the outer ends of the cores of these solenoids project into openings 209 in the stationary ring 210, and therefore, hold the clamps stationary and in the horizontal position. As the solenoid cores move inwardly to clamp the clamps on the paper the outer ends move inwardly from these openings and permit the ring 211 carrying the solenoids and the clamps to be rotated by the gear 206 and twist the ends of the paper on the roll. As indicated in Fig. 14, the solenoids are energized by a contact 211' on the movable ring engaging stationary contacts 208' on the stationary ring so that as the ring starts to rotate the circuit through the solenoids is broken but the clamps are held in engagement with the paper by the ends of the cores engaging the inner walls of the ring 210, but after their rotary movement is completed, one half revolution in the present instance, they again pass into the openings 209 under the action of the spring 212 releasing the paper. Immediately after the clamps 198 are set and start to rotate a thermostat 247 heated by a coil 248 opens the circuit by opening the switch 249 allowing the shaft 191 to be shifted under the action of spring 213 and break the driving connection to the arm 196. This permits the arm to be swung back by the spring 197 permitting the knife 199 to rise and break the circuit through the solenoid 203 allowing the clamps 198 to be opened as above described. A conveyor belt 215 which is constantly driven from the shaft 182 through the chain 216 immediately carries the wrapped roll to the right, as viewed in Fig. 1, and allows it to drop off the end of this conveyor onto a pivoted shelf 217 which is normally held in the elevated position by a spring 218. The weight of this roll forces the shelf downwardly closing the switch 219 which closes the circuit through the solenoid 220 (Figs. 8 and 16) which withdraws the lower contact and support 221 from under the coin 222 permitting it to drop into a receptacle and breaks the circuits through the machine stopping all operations. The wrapped roll is now in a position where it is easily accessible to the customer and is withdrawn through the opening 223 through the side of the casing.

Figure 16:
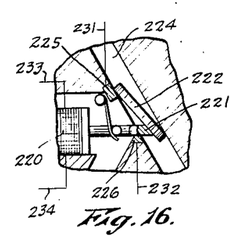
Fig. 16 is a detail section of the coin control.

As soon as the circuits are broken and the coin drops the contact 221 is moved back to the position of Fig. 16 to receive the next coin. The next customer deposits the proper coin in the slot and it drops through the chute 224 to the position of Fig. 16. It rests on the contact 221 and engages the upper contact 225, and as contact 221 rests on another contact 226 it completes the circuit closing the relay switch 227 and starts the motor 21 and completes the operation just described. The current for operating the relay switch is secured from any suitable source such as a battery 228 while the current for operating the motor is secured from any suitable source such as storage batteries or a house lighting circuit 229 and is controlled by a main hand switch 230. The relay switch is operated from the coin controlled switch by leads 231 and 232. The solenoid 220 is operated from the switch 219 through leads 231 and 232 from the leads 233 and 234 from the main supply to the motor. The various other solenoids for operating the devices are connected to the leads 233 and 234, as indicated in Fig. 15. They may be individually connected to these leads or they may all be connected through the leads 235 and 236. The various leads and switches for controlling the various solenoids are indicated diagrammatically in Fig. 15.

Figures 8, 10:
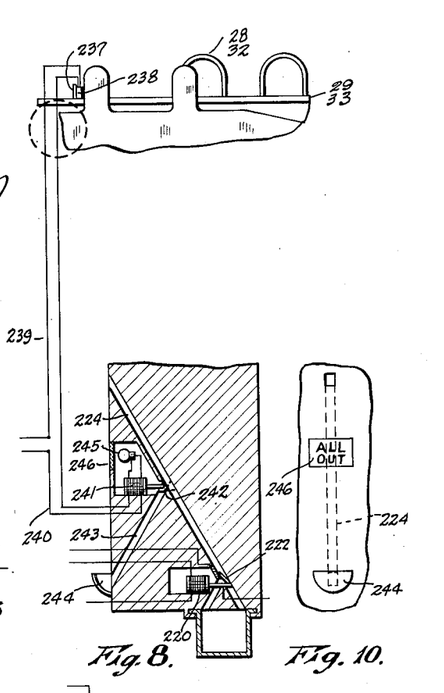
Fig. 8 is a partial sectional view and partial diagrammatical view of a cutout device for rendering the machine inoperative when the supply of either the rolls or frankfurters is exhausted.
Fig. 10 is a detail thereof looking from the left of Fig. 8.
Figure 9:
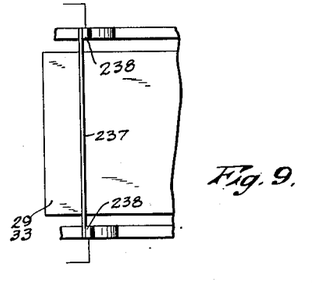
Fig. 9 is a detail of a portion of this device looking down from Fig. 8.

There is a safety or limit device provided for preventing operation of the machine should either the supply of rolls or the supply of frankfurters be exhausted, and also to return the customer's coin should he deposit the coin while the machine is in this condition. Carried by each of the supply belts 29 and 33 is a metal bar 237 (Figs. 8 and 9). This is secured to the belts adjacent the ends thereof after the last frankfurter or roll loop 28 or 32 so that on the next movement of the belt this bar is brought into engagement with insulated contacts 238, thus bridging these contacts, these contacts being connected by leads 239 and 240 to the outlet leads from the main switch 230. In this circuit is a solenoid 241 whose core is connected to a triangular block 242. This block is normally held from the chute 224 by a spring permitting the coin to pass down to the contacts 221 and 225. If, however, the bar 237 closes the circuit this block is shifted to the dotted line position of Fig. 8 across the chute 224 and will prevent the coin passing to the contacts 221 and 225 and will cause it to pass out through the vent chute 243 where it will be collected in the cup 244 and may be regained by the operator. Closing of the circuit by the bar 237 will also light a pilot light 245 back of a window 246 which will carry an appropriate sign indicating the supply of material in the machine is exhausted.

It will be apparent from the foregoing description that the various operations are all automatic and are interdependent upon each other. The customer deposits the coin in the chute 224 closing the circuit through the relay which in turn closes the main supply circuit for operating the main power motor and the controls for the separate devices operated from this motor. The rolls and the frankfurters are automatically fed one at a time and one for each vending operation from their respective supplies. The frankfurter is first treated with oil and then the frankfurter and roll are both thoroughly heated as they are transferred to the roll preparing and filling station. In this station the roll is slit and opened lengthwise, the heated frankfurter deposited in it and the mustard or other seasoning applied to the frankfurter. It is then automatically wrapped in a sanitary paper wrapping and deposited where it is easily accessible to the customer.

Having thus set forth the nature of my invention, what I claim is:

1. In a vending device, means for holding a supply of sausage fillings, means for holding a supply of rolls, means for slitting a roll longitudinally, means for transferring a filling from said supply to the slit roll, means for causing the filled roll to move to a given position, control means for operating the said means in certain timed relation with each other, and means operated by movement of the filled roll to reset the control means.

2. In a vending machine, means for holding a supply of sausage fillings, means for holding a supply of rolls, means for transferring a roll and a sausage from said supplies to a common point and placing the sausage in the roll, means for transferring the filled roll to a location accessible to a customer, control means for operating the before mentioned means in certain timed relation, and means operated by movement of the filled roll to reset the control means.

3. In a vending machine, means for holding a supply of sausage fillings, means for holding a supply of rolls, means for transferring a roll and a sausage from said supplies to a common point and placing the sausage in the roll including means for heating the roll and the sausage during transit, means for transferring the filled roll to a location accessible to a customer, control means for operating the before mentioned means in certain timed relation, and means operated by movement of the filled roll to reset the control means.

4. In a vending machine, a carrier for a supply of preformed meat fillings, a transfer means for carrying the filling from said carrier to a given location, means for heating the filling during transit, means at said location to deposit the filling in a roll, a receptacle for the filled roll, means for transferring the filled roll from said location to the receptacle, and means for operating said devices in certain timed relation.

5. In a vending machine, a carrier for a supply of preformed meat fillings, a carrier for a supply of rolls, transfer devices for carrying the rolls and the fillings from the carriers to a given station, means for heating the rolls and the fillings during transit, means at said station for depositing the filling in the roll, a receptacle, means for transferring the filled roll from said station to the receptacle, and means for operating said devices in certain timed relation.

6. In a vending machine, means for holding a supply of sausage fillings, a transfer means for carrying said fillings to a given station including a holder, an electrical heating element in said holder, a cage in the carrier for the filling, and means for rotating the cage during the transfer movement.

7. In a vending machine, means for holding a supply of sausage fillings, a transfer device for transferring the fillings from said supply to a given station comprising a movable holder including a hinged cover section, means adjacent said supply to deposit a filling in an open holder, means for then closing the cover, and means at another station to open the cover to discharge the filling.

8. In a vending machine, means for holding a supply of sausage fillings, a transfer device for transferring fillings from said supply to a given station, means for heating the fillings during the transfer movement, a container for oil between the supply and said transfer device, means for feeding the fillings from the supply to said oil container, means for transferring the fillings from said container to the transfer device, and means for operating said devices in certain timed relation.

9. In a vending machine, means for holding supplies of rolls and preformed fillings, means for transferring the rolls and fillings from the supplies to a filling station, means at said station for placing the filling in the roll, a wrapping device comprising means for wrapping a paper wrapper about the filled roll, and means for operating said devices in certain timed relation.

10. In a vending machine, means for holding supplies of rolls and preformed fillings, means for transferring the rolls and fillings from the supplies to a filling station, means at said station for placing the filling in the roll, a wrapping device comprising means for folding a piece of paper about the filled roll, means for twisting the ends of the wrapped paper to keep them closed, and means for operating said devices in certain timed relation.

11. In a vending machine, means for holding supplies of rolls and preformed fillings, means for transferring the rolls and fillings from the supplies to a filling station, means at said station for placing the filling in the roll, and means controlled by movements of the filled roll for wrapping a length of paper about the roll.

12. In a vending machine, means for holding supplies of rolls and preformed fillings, means for transferring the rolls and fillings from the supplies to a filling station, means at said station for slitting the roll from end to end and spreading the slit roll prior to the arrival of the filling, means for pressing the sides of the roll against the filling, and means for operating said devices in certain timed relation.

13. In a vending machine, means for holding supplies of rolls and preformed fillings, means for transferring the rolls and fillings from the supplies to a filling station, means at said station for slitting the roll longitudinally to receive the filling, means for applying a seasoning to the filling in the roll, means for wrapping the filled roll in a paper wrapping, and means for operating said devices in certain timed relation.

14. In a vending machine, means for holding supplies of rolls and preformed fillings, means for transferring the rolls and fillings from the supplies to a filling station, means at said station for placing the filling in the roll, means for placing the filled roll in a position accessible to a customer, means for operating said devices in certain timed relation, and means becoming effective by exhaustion of either the roll or filler supply to prevent operation of said devices.

15. In a vending machine, means for holding supplies of rolls and preformed fillings, means for transferring the rolls and fillings from the supplies to a filling station, means for shifting the fillings and the rolls one at a time from the supplies to said transfer means, means for heating the rolls and the fillings while in said transfer means, means at the filling station for placing the filling in the roll, means for wrapping a paper wrapping about the filled roll, and means for operating said devices in certain timed relation.

16. In a vending machine, means for holding supplies of rolls and preformed fillings, means for transferring the rolls and fillings from the supplies to a filling station, means for heating the rolls and the fillings while in said transfer means, means for slitting the roll lengthwise and spreading the slit roll to receive the filling, means for applying a seasoning to the filling, means for wrapping the filled roll in a piece of paper, and means for operating said devices in certain timed relation.

17. In a vending machine, means for holding supplies of rolls and preformed fillings, means for transferring the rolls and fillings from the supplies to a filling station, means for heating the rolls and the fillings while in said transfer means, means at said station for slitting the roll longitudinally and spreading the slit roll to receive the filling, means for applying a seasoning to the filling, means for pressing the sides of the roll against the filling, means for wrapping a paper wrapping about the filled roll and twisting the ends of said wrapping to close them, and means for operating said devices in certain timed relation.

In testimony whereof I affix my signature.

ALEXANDER FLAMM.